US010723326B2

(12) United States Patent
Jeon et al.

(10) Patent No.: US 10,723,326 B2
(45) Date of Patent: Jul. 28, 2020

(54) CONTENT CAPTURE AND DISTRIBUTION SYSTEM

(71) Applicant: Google Inc., Mountain View, CA (US)

(72) Inventors: Joon-Hee Jeon, Palo Alto, CA (US); Arnold C. Connell, Jr., Chicago, IL (US); Benjamin P. Stewart, Mountain View, CA (US)

(73) Assignee: Google LLC, Mountain View, CA (US)

( * ) Notice: Subject to any disclaimer, the term of this patent is extended or adjusted under 35 U.S.C. 154(b) by 152 days.

(21) Appl. No.: 15/721,481

(22) Filed: Sep. 29, 2017

(65) Prior Publication Data

US 2018/0097859 A1  Apr. 5, 2018

Related U.S. Application Data

(60) Provisional application No. 62/402,882, filed on Sep. 30, 2016.

(51) Int. Cl.
*H04L 29/06* (2006.01)
*B60S 1/68* (2006.01)
*H04N 21/2747* (2011.01)
(Continued)

(52) U.S. Cl.
CPC .............. *B60S 1/68* (2013.01); *B60H 1/0075* (2013.01); *H04H 40/18* (2013.01); *H04L 65/4076* (2013.01); *H04L 65/601* (2013.01); *H04N 21/2187* (2013.01); *H04N 21/2393* (2013.01); *H04N 21/26258* (2013.01); *H04N 21/2747* (2013.01); *H04N 21/47202* (2013.01); *H04N 21/6112* (2013.01); *H04N 21/6125* (2013.01);
(Continued)

(58) Field of Classification Search
CPC ............. H04N 21/239; H04N 21/2747; H04N 21/472; H04N 21/61; H04N 21/2187; H04N 21/262; H04L 29/06
See application file for complete search history.

(56) References Cited

U.S. PATENT DOCUMENTS

2002/0023165 A1* 2/2002 Lahr ................... H04L 12/1881
709/231
2012/0008719 A1 1/2012 Shirasuka et al.
(Continued)

OTHER PUBLICATIONS

"International Preliminary Report on Patentability", PCT Application No. PCT/US2017/054563, dated Jan. 9, 2019, 19 pages.
"International Search Report and Written Opinion", PCT Application No. PCT/US2017/054563, dated Nov. 29, 2017, 16 pages.
"Written Opinion", PCT Application No. PCT/US2017/054563, dated May 24, 2018, 9 pages.

*Primary Examiner* — Aftab N. Khan
(74) *Attorney, Agent, or Firm* — Colby Nipper PLLC

(57) ABSTRACT

Content capture and distribution systems and techniques are described. In an example, radio frequency signals that carry content are captured by one or more antennas of a content capture system. The content is converted from radio frequency signals the carry the content into an internet protocol format by the content capture system. The converted content is transmitted by the content capture system via a network transfer protocol (e.g., HTTP) for receipt by a content distribution system via a network. The converted content is configured by the content distribution system for streaming via a network streaming protocol. The content is then streamed by the content distribution system via the network using the network streaming protocol for receipt and rendering by at least one client device.

20 Claims, 7 Drawing Sheets

(51) Int. Cl.
  *H04N 21/239* (2011.01)
  *H04N 21/2187* (2011.01)
  *H04N 21/262* (2011.01)
  *H04N 21/845* (2011.01)
  *H04N 21/61* (2011.01)
  *H04N 21/472* (2011.01)
  *B60H 1/00* (2006.01)
  *H05B 3/20* (2006.01)
  *H04H 40/18* (2008.01)
  *H04L 29/08* (2006.01)

(52) U.S. Cl.
  CPC ..... *H04N 21/6143* (2013.01); *H04N 21/8456* (2013.01); *H05B 3/20* (2013.01); *H04L 65/607* (2013.01); *H04L 67/06* (2013.01)

(56) References Cited

U.S. PATENT DOCUMENTS

| | | | |
|---|---|---|---|
| 2012/0127363 A1* | 5/2012 | Kanojia | H04N 21/6175 348/384.1 |
| 2012/0144445 A1* | 6/2012 | Bonta | H04L 12/1868 725/116 |
| 2012/0304240 A1* | 11/2012 | Pereira | H04N 21/2187 725/116 |
| 2013/0191858 A1 | 7/2013 | Kanojia et al. | |
| 2013/0276048 A1* | 10/2013 | Krasic | H04N 21/2187 725/116 |
| 2013/0332580 A1* | 12/2013 | Subramanian | H04L 65/601 709/219 |

\* cited by examiner

CONTENT CAPTURE AND DISTRIBUTION SYSTEM

BACKGROUND

Users have access to an ever expanding variety of devices that may be used to consume content. For example, users have progressed from dedicated devices such as television and radio to mobile phones and tablet computers to consume content. To address this, content providers have also expanded the ways in which this content may be accessed.

An example of this is a content broadcast system. Conventional content broadcast systems typically relied on an "over the air" broadcast of content or a dedicated delivery system that requires specialized equipment (e.g., cable or satellite system) to broadcast content such as television and radio. In order to make this content available to users of mobile phones and tablets, techniques have then been developed by the content broadcast systems to stream the content over a network. However, these conventional techniques rely on complicated and expensive hardware systems that are specialized by the content broadcast systems to do so. Accordingly, this complexity and expense limits availability of these hardware systems and functionality made available by these systems.

SUMMARY

Content capture and distribution systems are described. In one example, a content distribution system includes a capture management module and a distribution management module. The capture management module is implemented at least partially in hardware to manage capture of broadcasts of radio frequency signals having content by a plurality of content capture systems and transmission of the content to the distribution management module according to an Internet protocol (IP) format by the plurality of content capture systems as converted from the radio frequency signals. The distribution management module is implemented at least partially in hardware to stream the content that is received from the plurality of content capture systems via a network streaming protocol to respective ones of a plurality of client devices via a network.

In another example, a content distribution system a capture management module and a distribution management module. The capture management module is implemented at least partially in hardware to remotely manage capture of broadcasts of radio frequency signals having content by a plurality of content capture systems. In addition, the capture management module is configured to manage transmission of the content to a distribution management module according to an Internet protocol (IP) format by the plurality of content capture systems as converted from the radio frequency signals. In aspects, the transmission of the content includes transmission of first content from a first content capture system of the plurality of content capture systems. The transmission may further include second content from a second content capture system of the plurality of content capture systems. The first content and the second content may be captured from a same broadcast source. The distribution management module is implemented at least partially in hardware to select and configure the first content for streaming via a network streaming protocol to a plurality of client devices based on a redundancy comparison between the first content and the second content. In addition, the distribution management module is configured to stream the configured first content to respective client devices of the plurality of client devices via a network using the network streaming protocol.

In a further example, a method is described that includes managing remote capture of radio frequency signals that carry content by a plurality of content capture systems. The method further includes managing transmission of the content according to a network transfer protocol (e.g., HTTP) for receipt by a content distribution system via a network. The content is configured by the content distribution system for streaming via a network streaming protocol. The content is then streamed by the content distribution system via the network using the network streaming protocol for receipt and rendering by at least one client device.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
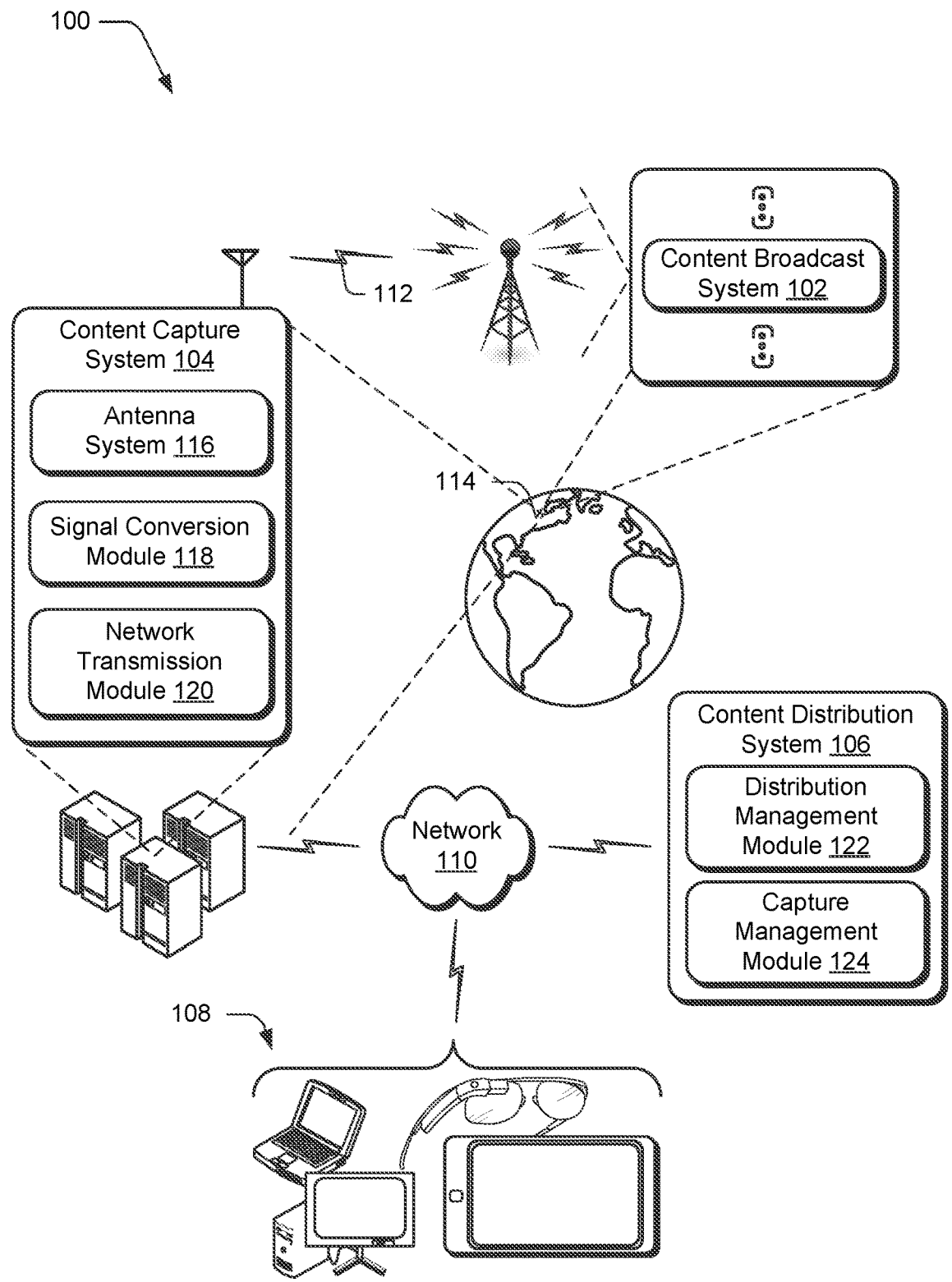
FIG. 1 is an illustration of an environment in an example implementation that is operable to employ content capture and distribution techniques and systems described herein.

Conventional hardware systems relied upon by content broadcaster systems (e.g., television and radio broadcasters) to expand availability of content are complicated, expensive, and rely on specialized hardware. As such, this complexity and expense limits availability, use, and even operation of these conventional hardware systems.

Content capture and distribution systems are described in the following that are configured to capture "over the air" broadcasts of content and make this content available via a network, e.g., the internet. As part of this, a content capture system is deployed at a geographic location to capture radio signals from a content broadcast system, e.g., using an antenna system.

A signal conversion module is then employed by the content capture system to convert the radio signals into internet protocol (IP) data that has the content, such as in accordance with an MPEG transport stream. This IP data (e.g., raw video feed) is then transmitted by the content capture system using a network transfer protocol (e.g., as full bit-rate "chunks" using a secure hypertext transfer protocol) for distribution by a content distribution system. In this way, the content capture system may be implemented using relatively inexpensive hardware at the geographic location and provide the content in high quality without human interaction.

The content distribution system then receives the content via the network transfer protocol and configures the content for distribution via a network streaming protocol, e.g., MPEG-DASH. Client devices, such as mobile phones, tablets, desktop computers, smart televisions, and so forth may then receive and render a stream of the content for output to a user. As a result, the content distribution system, along with the content capture system, may make this content available to a wide variety of devices.

The content distribution system may be implemented in a variety of ways. In one example, the content distribution system is implemented "in the cloud" via a collection of computing devices (e.g., a plurality of server farms). This implementation enables a variety of operations to be performed external to, and remotely from, the content capture system, such as data processing, transcoding, distribution, and so on. Further benefits include a reduction in hardware required at the capture site, as well as a reduction in cost because the bulk of the computing can be performed more cheaply and reliably in the cloud, in comparison to conventional systems.

The content distribution system, along with functionality used to stream the content, may also include a variety of other functionality. In one example, this includes functionality to repair the content. The content capture systems, for instance, as described above are implemented using relatively inexpensive hardware that costs a fraction of conventional dedicated hardware. Because of this, multiple content capture systems may be deployed in a cost effective manner to capture radio signals from a single content broadcast system, e.g., to capture matching content. Redundancy provided by the multiple content capture systems in the capture of data may be used to repair errors encountered in the capture of this content, support switching between content capture systems (e.g., due to outages), and so forth. Functionality of the content distribution system may also be distributed across a plurality of server farms, thereby protecting against failure. In this way, the content capture and distribution systems have increased robustness over conventional systems.

In another example, the content distribution system is configured to control operation of the content capture systems remotely. A user accessing the content distribution system, for instance, may interact with a user interface to control when content capture systems capture content, frequencies used by the content capture systems to capture the radio signals having the content, and so forth. As such, a user may control operation of a multitude of content capture systems distributed across a variety of geographic locations. Other examples are also contemplated as further described in the following.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein. The illustrated environment 100 includes a content broadcast system 102, a content capture system 104, a content distribution system 106, and a plurality of client devices 108 that are configured to consume content received from the content distribution system 106 via a network 110, e.g., the internet.

The client devices 108 may be configured in a variety of ways. For instance, the client devices 108 may be configured as a desktop computer, a laptop computer, a mobile device (e.g., assuming a handheld configuration such as a tablet or mobile phone as illustrated), and so forth. Thus, the client devices 108 may range from full resource devices with substantial memory and processor resources (e.g., personal computers, game consoles) to a low-resource device with limited memory and/or processing resources (e.g., mobile devices).

The content broadcast system 102 is implemented using hardware (e.g., a transmitter and antenna) to transmit radio frequency signals 112 "over the air" that include content, such as television or radio content. The radio frequency signals 112 may carry the content as an analog signal or digital signal, e.g., numerically encoded form.

The content capture system 104 is positioned at a geographic location 114 having a proximity to the content broadcast system 102 sufficient to receive the radio signals 112, e.g., within the same city. The content capture system 104 includes an antenna system 116 that is configured to receive the radio frequency signals 112 having the content. The content capture system 104 also includes a signal conversion module 118 that is representative of hardware configured to convert the content carried by radio frequency signals 112 into an Internet Protocol (IP) format, such as MPEG-TS. The content capture system 104 then employs a network transmission module 120 to transmit the content using the IP format using a network transfer protocol, such as in accordance with a secure hypertext transfer protocol (HTTPS). Thus, the content capture system 104 may be configured as "light" system for deployment at geographic locations at a fraction of the cost of conventional hardware systems. Further discussion of operation of the content capture system 104 is described in relation to FIG. 2.

The content distribution system 106 then receives the content in the IP format via the network 110, e.g., the internet. The content distribution system 108 includes a distribution management module 122 that is implemented at least partially in hardware to manage distribution of the content received by the content capture system 104 via the network 110 to the plurality of client devices 108. The distribution management module 112, for instance, may configure the content in accordance with a network streaming protocol such as MPEG-DASH. The plurality of client devices 108 may then receive the content via a stream in accordance with the network streaming protocol and render it for output to a user, e.g., via a browser, a dedicated application, and so forth. In this way, the content from the content broadcast system 102 may be disseminated for consumption across a wide range of client devices 108 as further described in relation to FIG. 3.

The content distribution system 106 also includes a capture management module 124. The capture management module 124 is representative of functionality implemented at least partially in hardware to manage operation of the content capture system 104. This may include scheduling of when and how (e.g., what frequencies and protocols) the content capture system 104 captures and converts the content via the radio frequency signals 112. Further discussion of management of the content captures system is described in the following in relation to FIG. 5.

Figure 2:
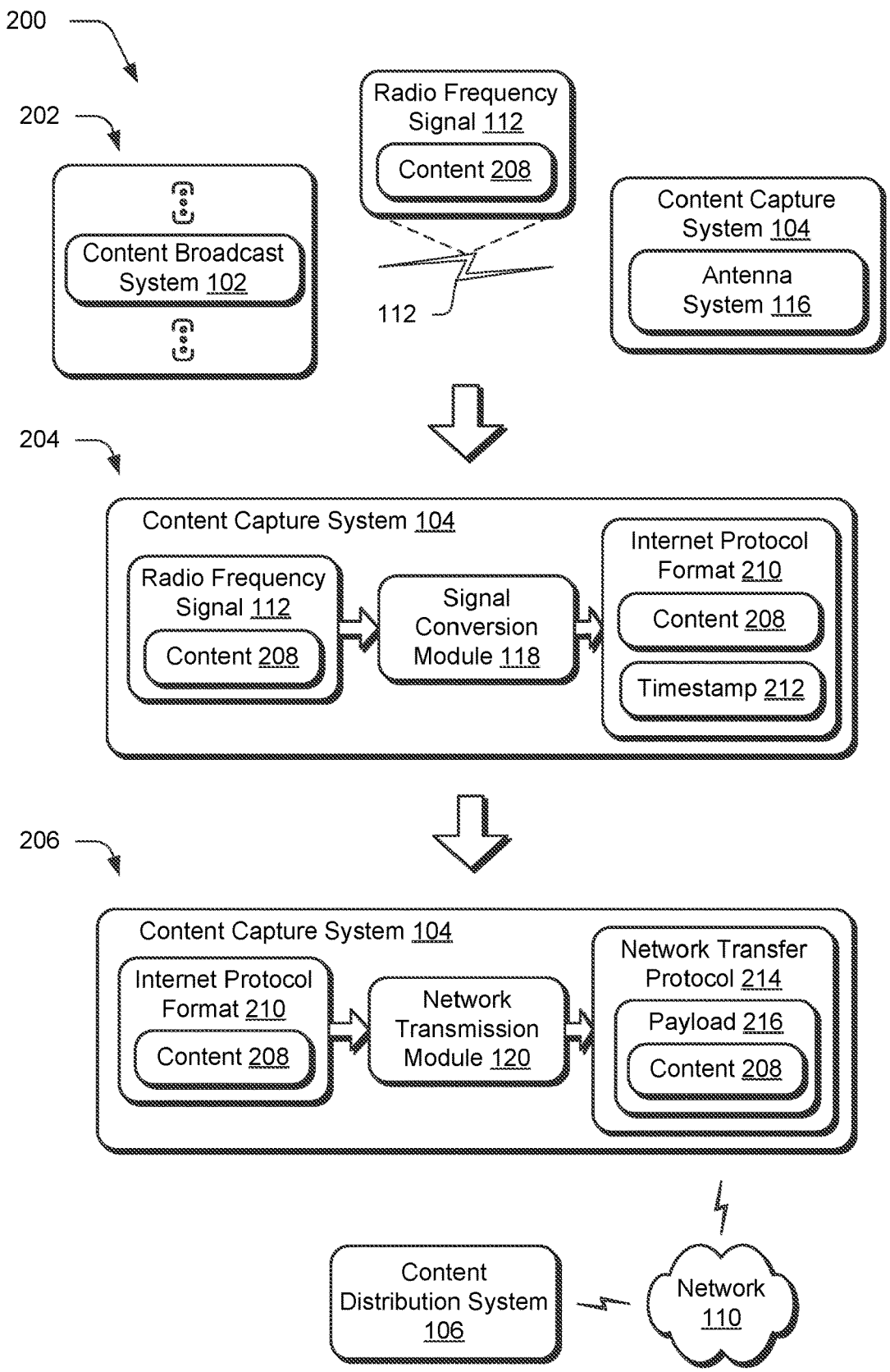
FIG. 2 depicts a system in an example implementation showing operation of a content capture system of FIG. 1 in greater detail as capturing "over the air" content.

FIG. 2 depicts a system 200 in an example implementation showing operation of the content capture system 104 of FIG. 1 in greater detail as capturing "over the air" content. The system 200 is illustrated using first, second, and third stages 202, 204, 206. At the first stage 202, the content capture system 104 employs an antenna system 116 to capture a broadcast of radio frequency signals 112 from a content broadcast system 102 "over the air." The radio frequency signals 112 are used to carry the content 208 as an analog signal or a digital signal, i.e., in a numerically encoded form. As previously described, this may include a variety of types of content, such as television or radio content.

At the second stage 204, a signal conversion module 118 of the content capture system 104 converts the content 208 as carried by the radio frequency signal 112 into an internet protocol format 210. A variety of internet protocol formats 210 may be used to store and transport the content 208 digitally, an example of which includes an MPEG transport stream (MPEG-TS). An MPEG transport stream is a digital content format for transmission and storage of audio, video, or other data that specifies a container format to encapsulate packetized elementary streams.

The signal conversion module 118 may be implemented in a variety of ways. In one example, the signal conversion module 118 is implemented as an RF to IP video processor as part of a rack-mounted system. The system includes a plurality of interchangeable components (e.g., circuit boards) that are configured to decode different formats of the content 208 as received via the radio frequency signal 112 that are employed by different content broadcast systems 102. In this way, the content capture system 104 may be deployed across a variety of geographic locations across the globe by providing a corresponding component that is configured to decode the broadcast.

As part of the conversion, the signal conversion module 118 may assign a timestamp 212 to respective portions of the content, e.g., packets as part of a header. The timestamp 212 may be used to control an order of output and navigation within the content 208 when rendering, as well as for synchronization with other content captured by other content capture systems as further described in relation to FIG. 5.

At the third stage 206, a network transmission module 120 is employed to communicate the content 208 via a network 110 to a content distribution system 106. To do so, the network transmission module 120 configures the content 208 in the internet protocol format 210 according to a network transfer protocol 214, e.g., through use of a transmission server and a network deployment switch. A variety of different network transfer protocols 214 may be used, such as HTTPS.

For example, the network transmission module 120 may form a plurality of "chunks" of the content 208. These chunks are included as a payload 216 that is transferred over the network 110 as specified by the HTTPS protocol, e.g., supporting authentication and encryption to protect against potentially malicious parties. In an implementation, the content 208 included as the payload 216 is a full-bitrate version of the content 208 as converted by the signal conversion module 118 and thus preserves an output richness of the content 208 for receipt by the content distribution system 106.

Thus, as described above the content capture system 104 may be implemented using relatively inexpensive devices that cost a fraction of conventional proprietary systems, e.g., cost less than twenty percent of these conventional systems. The content capture system 104 is a "light" system in this example in that the system is responsible for capture and communication of the content 208 with minimal processing. Further processing of the content 208 is then performed by the content distribution system 106 (e.g., "in the cloud") and thus can take advantage of efficiencies and robustness of server farms and large backend systems, an example of which is further described in the following.

Figure 3:
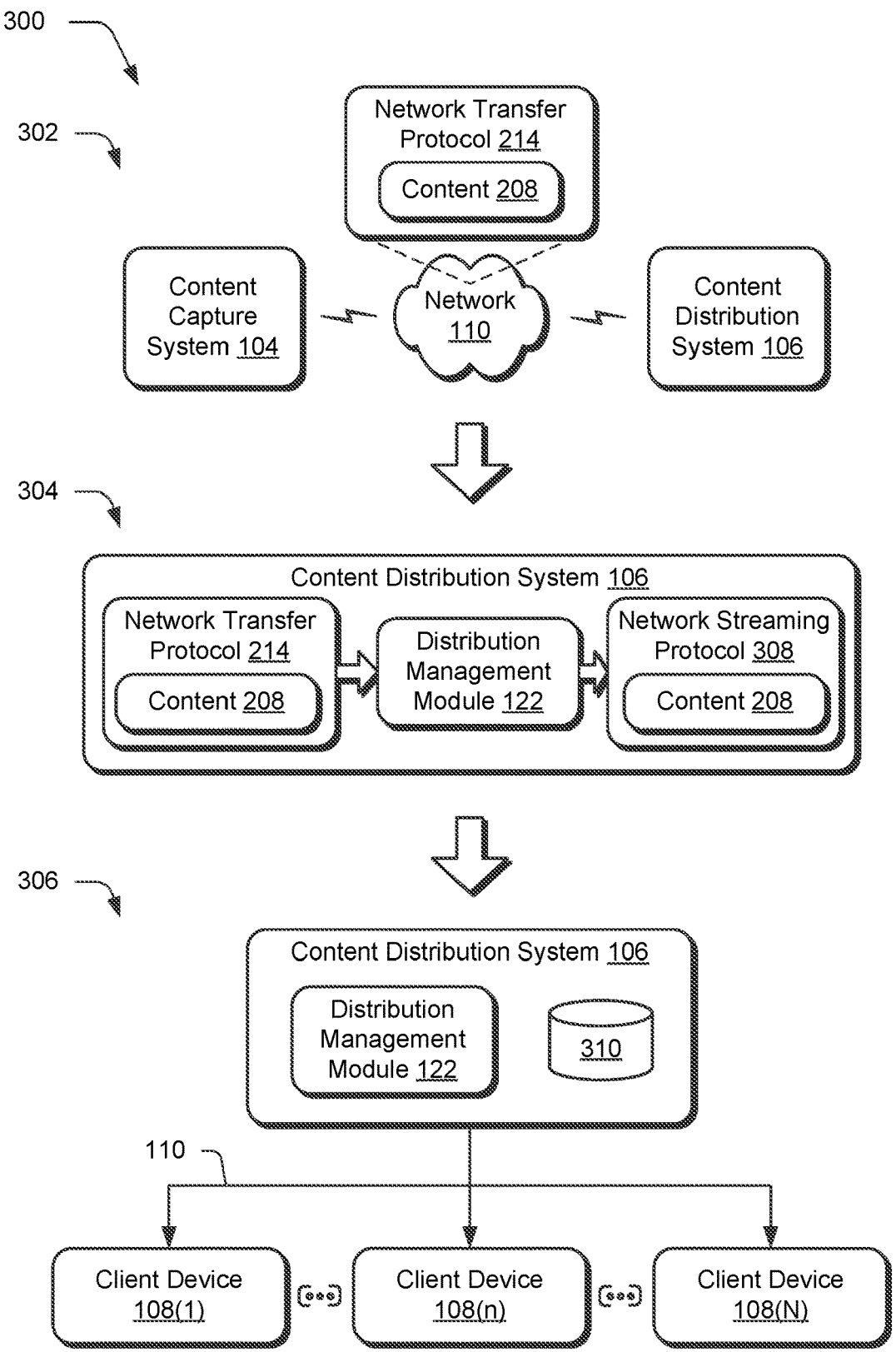
FIG. 3 depicts a system in an example implementation showing operation of a content distribution system to distribute content received via a network from a content capture system of FIG. 2.

FIG. 3 depicts a system 300 in an example implementation showing operation of the content distribution system 106 to distribute content 208 received via the network 110 from the content capture system 104 of FIG. 2. This system 300 is also illustrated using first, second, and third stages 302, 304, 306.

At the first stage 302, the content distribution system 106 receives the content via a network transfer protocol 214 from the content capture system 104. The content 208, for instance, is a full bitrate version as captured by the content capture system 104 that is communicated via the internet using HTTPS.

At the second stage 304, the content 208 received via the network transfer protocol 214 is configured by a distribution management module 122 for streaming via a network streaming protocol 308. The distribution management module 122, for instance, may form the content 208 into a plurality of segments and generate a manifest that describes those segments, e.g., in accordance with MPEG-DASH. The distribution management module 122 may then store the content 208 in storage 310 for streaming via the network to a plurality of client devices 108(1), ..., 108(n), ..., 108(N) as shown at the third stage 306.

Figure 4:
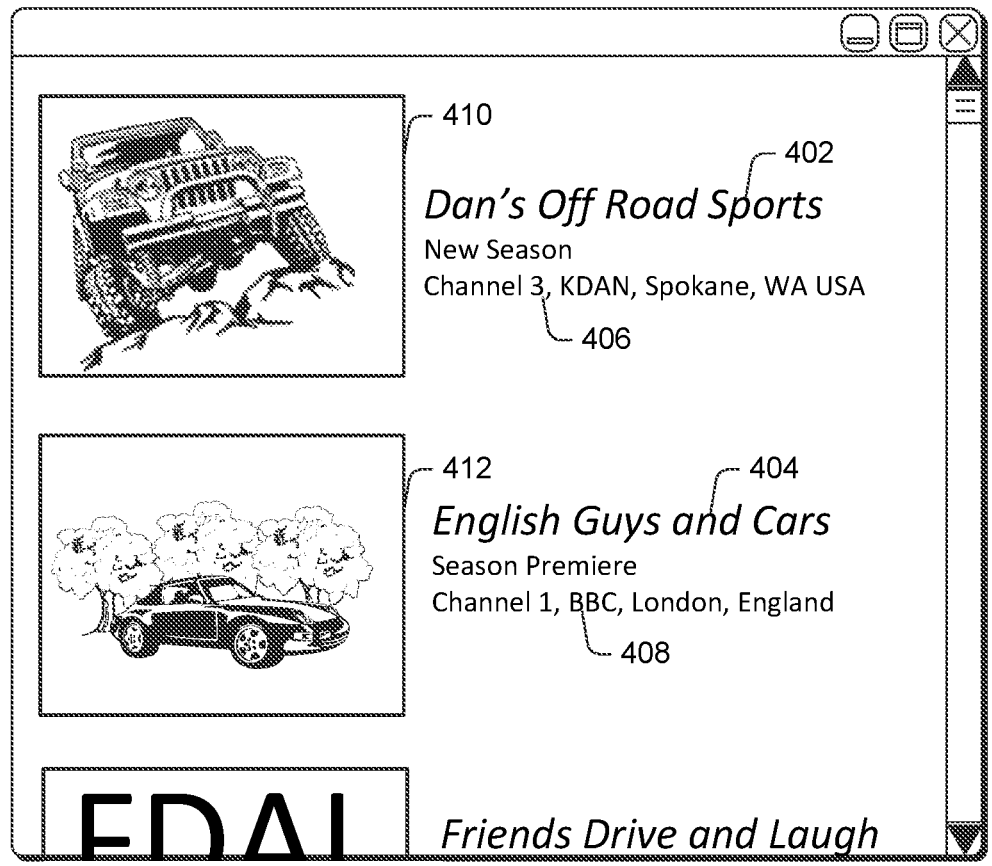
FIG. 4 depicts an example user interface that is output by a content distribution system to the plurality of client devices to select content from the content distribution system for output and rendering.

FIG. 4 depicts an example user interface 400 that is output by the content distribution system 106 to the plurality of client devices 108 to select content from the content distribution system 106 for output and rendering. The user interface 400 is generated by the content distribution system 106 and distributed for output by the plurality of client devices 108. The user interface 400 may be output by the client devices 108 in a variety of ways, such as via a browser, dedicated application, and so forth. In the illustrated example, the user interface 400 includes a title 402, 404 of the content, an originator 406, 408 of the content, and a picture-in-picture 410, 412 feed of the content. A user may select any of these portions to cause streaming of the represented content from the content distribution system 106. In this way, a user of the client devices 108 may access a wide range of content from a variety of geographic locations.

Figure 5:
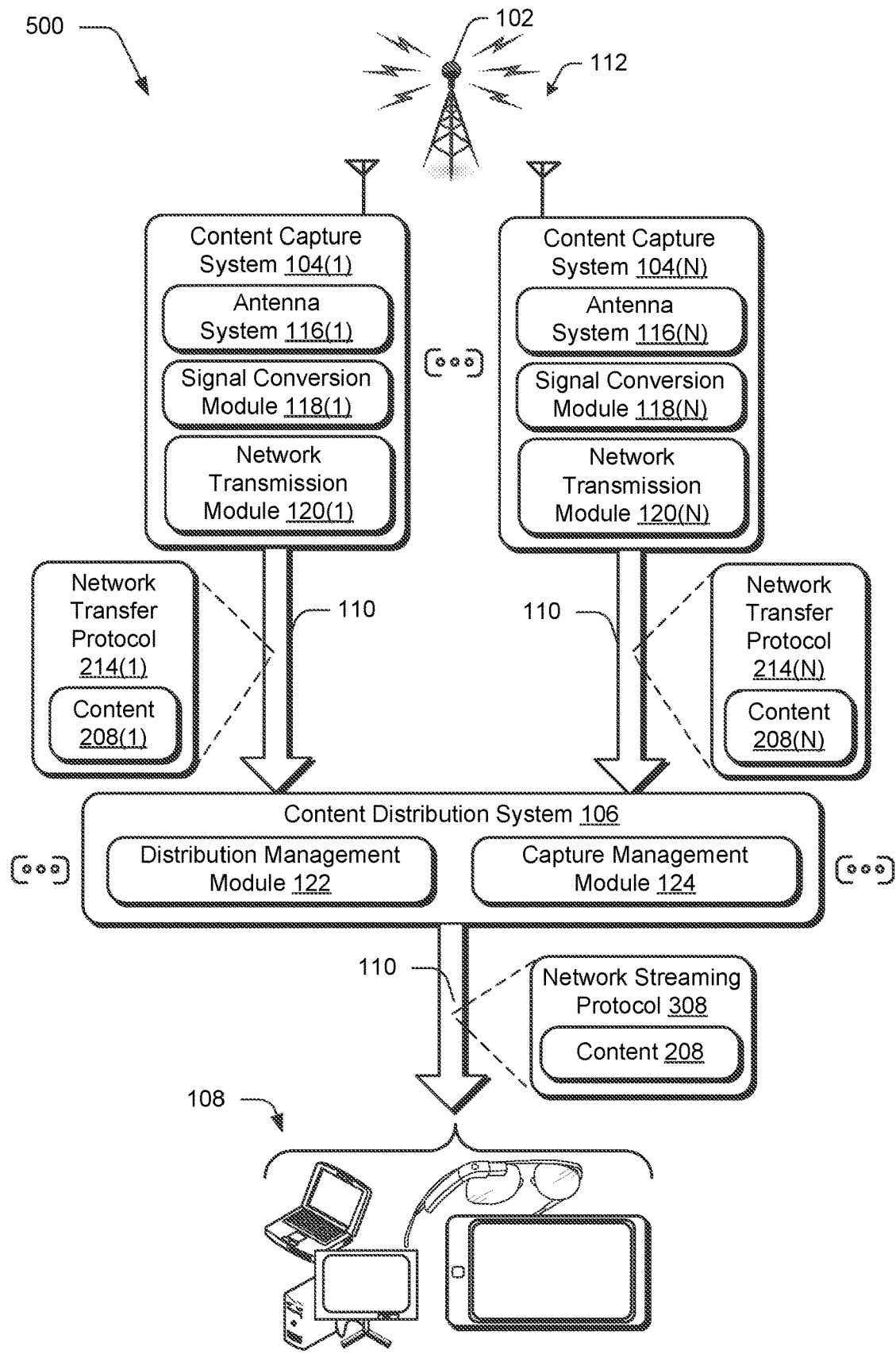
FIG. 5 depicts a system in an example implementation in which the content distribution system is configured to control operation of and leverage content obtained from a plurality of content capture systems.

FIG. 5 depicts a system 500 in an example implementation in which the content distribution system 106 is configured to control operation of and leverage content obtained from a plurality of content capture systems 104(1)-104(N). Content capture and distribution is bifurcated across the content capture system 104 and content distribution system 106. As such, the content capture system 104 may be implemented using relatively inexpensive devices when compared to conventional dedicated hardware systems. Because of this, a plurality of content capture systems 104 may be employed to capture a same (i.e., matching) broadcast of content from a content distribution system 102.

In the illustrated example, a plurality of content capture systems 104(1)-104(N) are configured to capture radio frequency signals 112 having the same broadcast of content. The content capture systems 104(1)-104(N) each include respective antenna systems 116(1)-116(N), signal conversion modules 118(1)-118(N), and network transmission modules 120(1)-120(N) as previously described in relation to FIG. 2. Accordingly, the plurality of content capture systems 104(1)-104(N) provide a plurality of content 208(1)-208(N) via the network 110 to the content distribution system 106.

The content distribution system 106 may leverage redundancy of this content 208(1)-208(N) in a variety of ways. In one example, the distribution management module 112 uses the content 208(1)-208(N) to repair errors that may be caused as part of capture (e.g., interference in the radio frequency signals), conversion, and/or transmission over the network 110 to the content distribution system 106. The distribution management module 112 is configured to automatically select a particular copy of a chunk of the content 208 based on a redundancy comparison between different copies of the chunk. The comparison may indicate that the particular copy of the chunk is healthier, e.g., has less data corruption, than another copy of the chunk. In this way, the healthiest copy of each chunk is used for streaming the content 208 to the client devices 108. Further, the comparison of chunks of the same content and the selection of the healthiest chunk can be performed automatically at the content distribution system and without user intervention.

In another example, the content 208(1)-208(N) may be used to address potential outages, e.g., of the content capture systems 104(1)-104(N) or network functionality used to communicate the content 208(1)-208(N) over the network 110. This may be performed by switching between transmissions due to these outages.

Implementation of the content distribution system 106 may also be distributed, e.g., across a plurality of server farms. For example, a first server farm may receive content 208(1) while another server farm receives content 208(N). In this way, operation of the content distribution system 106 itself is also protected against potential outages of the server farms, thereby improving robustness of the overall system.

The content distribution system 106 also includes a capture management module 124. The capture management module 124 is representative of functionality implemented at least partially in hardware of the content distribution system 106 to manage capture of content by respective content capture systems 104(1)-104(N). The capture management module 124, for instance, may control "when" and "how" the content capture systems 104(1)-104(N) capture content, e.g., times to turn on and frequencies used to capture the content. In this way, bifurcation of the system used to capture and distribute content may provide rich content in an efficient manner.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

Figure 6:
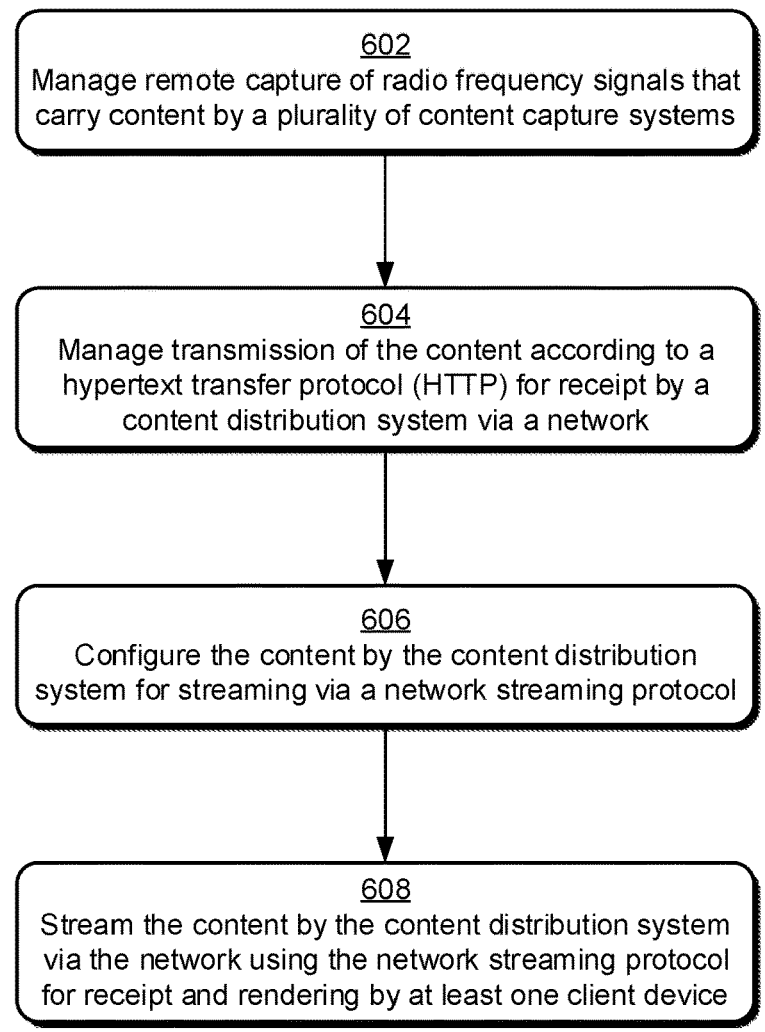
FIG. 6 is a flow diagram depicting a procedure in an example implementation in which over-the-air content is captured and distributed.

FIG. 6 depicts a procedure 600 in an example implementation in which over-the-air content is captured and distributed. Remote capture of radio frequency signals that carry content by a plurality of content capture systems in each of a plurality of geographic areas is managed (block 602). As shown in FIG. 2, for instance, the content capture system 104 includes an antenna system 116 configured to capture radio frequency signals 112 from a content broadcast system 102. This functionality is managed by the distribution management module 122 of the content distribution system 106 in FIG. 3. The content is then converted from radio frequency signals that carry the content into an internet protocol format by the content capture system, such as in accordance with an MPEG-TS Transmission of the content is managed according to a hypertext transfer protocol (HTTP) for receipt by a content distribution system via a network (block 604). For instance, multiple copies of the content captured by the plurality of content capture systems from a same broadcast source can be transmitted to the content distribution system to enable redundancy checks and error correction of one or more of the copies.

Upon receipt, the content is configured by the content distribution system for streaming via a network streaming protocol (block 606), such as through use of a manifest and segments in accordance with MPEG-DASH. The content is then streamed by the content distribution system via the network using the network streaming protocol for receipt and rendering by at least one client device (block 610). The plurality of client devices 108, for instance, may interact with the user interface 400 of FIG. 4 to select particular items of interest for streaming to the client device 108.

Example System and Device

Figure 7:
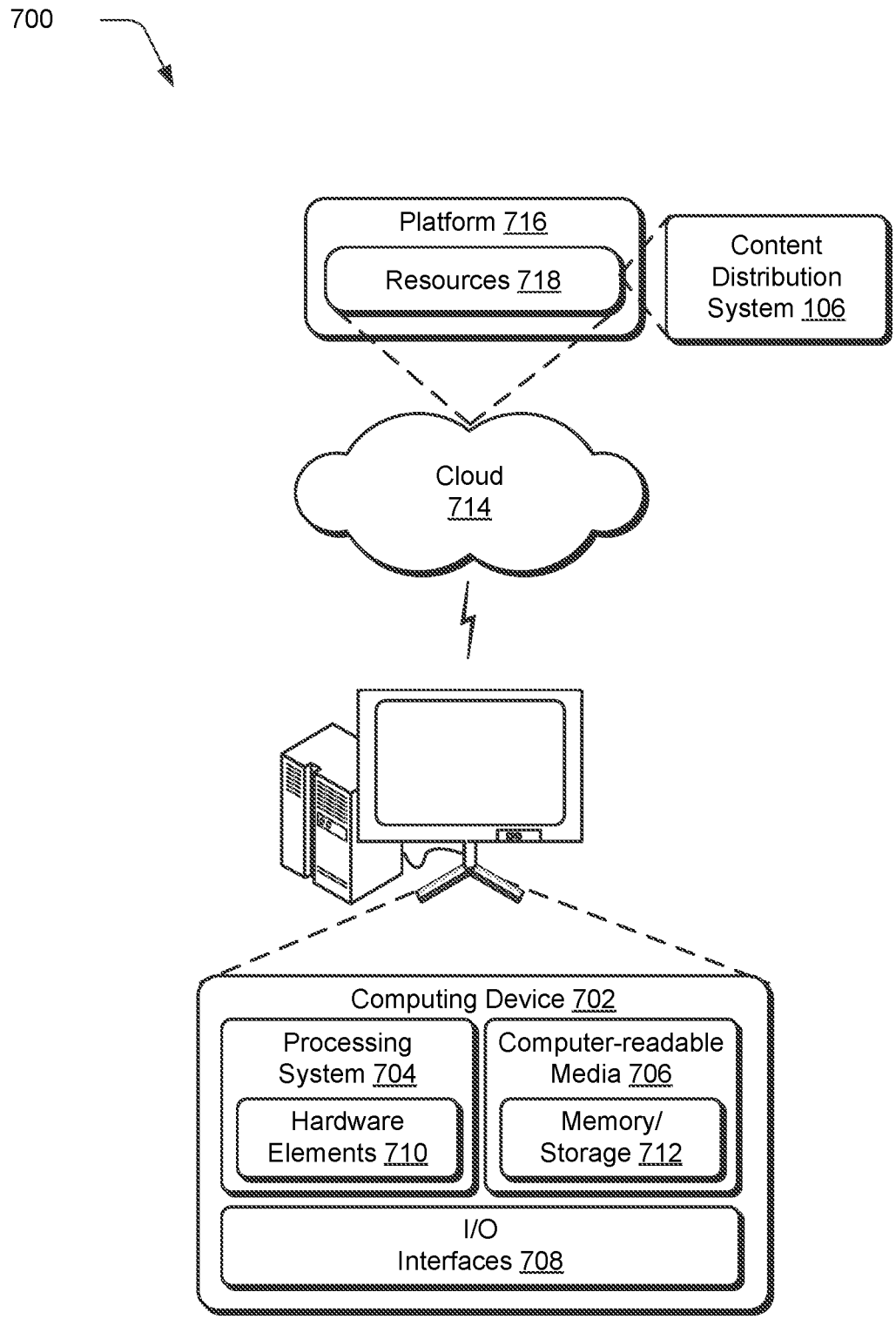
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the content distribution system 106. The computing device 702 may be, for example, a server of a service provider, a device associated with a client (e.g., a client device), an on-chip system, and/or any other suitable computing device or computing system to implement all or parts of the content broadcast system 102, content capture system 104, content distribution system 106, and/or plurality of client devices 108.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A content distribution system comprising:
    a capture management module implemented at least partially in hardware to:
        receive a request from a client device to control operation of a plurality of content capture systems that are distributed across a plurality of geographic locations, the request indicating user-selected times and frequencies to be used by the plurality of content capture systems to capture radio frequency signals; and
        responsive to the request, remotely control the plurality of remote content capture systems to:
            capture, based on the user-selected times and frequencies, broadcasts of radio frequency signals having content; and
            transmit the content to a distribution management module according to an Internet protocol (IP) format by the plurality of content capture systems as converted from the radio frequency signals; and
    the distribution management module implemented at least partially in hardware to:
        receive first and second transmissions of the content from first and second content capture systems, respectively, of the plurality of content capture systems, the first and second transmissions including a plurality of chunks of matching content captured from a single broadcast source;
        automatically select a particular copy of a chunk of the matching content from one of the first transmission or the second transmission based on a redundancy comparison between different copies of the chunk to repair an error in the matching content and provide repaired content, the comparison indicating that the particular copy of the chunk has less data corruption than another copy of the chunk from another of the first transmission or the second transmission; and
        stream the repaired content, including the automatically-selected particular copy of the chunk of the matching content that has less data corruption than the other copy of the chunk, the repaired content streamed via a network streaming protocol to the client device via a network.

2. The content distribution system as described in claim 1, wherein the content is television or radio content that is broadcast over the air using the radio frequency signals.

3. The content distribution system as described in claim 1, wherein the capture management module is configured to remotely control the capture of the broadcasts by the plurality of content systems by controlling when or what frequency is used to perform the capture by the plurality of content capture systems.

4. The content distribution system as described in claim 1, wherein the first content capture system is located at a different geographic location than the second content capture system to capture different said content.

5. The content distribution system as described in claim 1, wherein the distribution management module is configured to switch between the first and second transmissions of the content in response to a failure to receive either one of the first or second transmissions.

6. The content distribution system as described in claim 1, wherein the transmission of the content by the content capture systems employs a hypertext transfer protocol (HTTP).

7. The content distribution system as described in claim 1, wherein the network streaming protocol employs a manifest and a plurality of segments of the content as specified by the manifest.

8. The content distribution system as described in claim 1, wherein the request includes a user selection of at least one of a plurality of different items of said content that is captured by respective content capture systems of the plurality of content capture systems for streaming to and rendering by the client device.

9. The content distribution system as described in claim 1, wherein the distribution management module is configured to expose a user interface for output by the one or more client devices to enable user selection of the times and frequencies to be used by the plurality of content capture systems to capture the radio frequency signals for streaming to and rendering by the one or more client devices.

10. A content distribution system comprising:
    a capture management module implemented at least partially in hardware to:
        receive a request from one or more client devices to control operation of a plurality of content capture systems that are distributed across a plurality of geographic locations to capture radio frequency signals having content, the request indicating user-selected times and frequencies to be used by the plurality of content capture systems to capture the radio frequency signals; and
        responsive to the request, remotely control the plurality of remote content capture systems to:

capture, based on the user-selected times and frequencies, broadcasts of the radio frequency signals having the content; and transmit the content to a distribution management module according to an Internet protocol (IP) format by the plurality of content capture systems as converted from the radio frequency signals, the transmission of the content including a first transmission of first content from a first content capture system of the plurality of content capture systems and a second transmission of second content from a second content capture system of the plurality of content capture systems, the first content and the second content having matching content captured from a same broadcast source; and the distribution management module implemented at least partially in hardware to:

determine that a first copy of a chunk of the matching content from the first content is healthier than a second copy of the chunk of the matching content from the second content based on a redundancy comparison between the first and second copies of the chunk that indicates that the first copy has less data corruption than the second copy;

select the first copy of the chunk of the matching content from the first content for streaming via a network streaming protocol to the one or more client devices based on the determination that the first copy of the chunk is healthier than the second copy of the chunk; and stream at least the selected first copy of the chunk of the matching content from the first content to respective client devices of the one or more client devices via a network using the network streaming protocol.

11. The content capture system as described in claim 10, wherein the distribution management module is configured to form the content into a plurality of segments and generate a manifest that describes the plurality of segments.

12. The content capture system as described in claim 10, wherein the distribution management module is configured to store the content in storage for subsequent streaming via the network to the one or more client devices.

13. The content capture system as described in claim 10, wherein the distribution management module is configured to expose a user interface for output by the one or more client devices to enable user selection of the times and frequencies to be used by the plurality of content capture systems to capture the radio frequency signals.

14. A method comprising:

receiving, by a content distribution system and from a client device, an input for controlling operation of a plurality of remote content capture systems that are distributed across a plurality of geographic locations;

controlling, by the content distribution system, the plurality of remote content capture systems to capture radio frequency signals that carry content, the controlling including:

determining frequencies used by the plurality of content capture systems to capture the radio frequency signals; and determining times for the plurality of content capture systems to capture the radio frequency signals;

managing, by the content distribution system, transmission of the content according to a hypertext transfer protocol (HTTP) for receipt by the content distribution system via a network, the transmission of the content including first and second transmissions of the content by first and second content capture systems, respectively, of the plurality of remote content capture systems, the first and second transmissions including a plurality of chunks of matching content from a single broadcast source;

configuring the content by the content distribution system for streaming via a network streaming protocol, the configuring including repairing an error in the matching content using the first and second transmissions of the content by automatically selecting a particular copy of a chunk of the matching content from one of the first or second transmissions based on a redundancy comparison between different copies of the chunk that indicates that the particular copy of the chunk of the matching content from the one of the first or second transmissions has less data corruption than another copy of the chunk of the matching content from another of the first or second transmissions; and streaming the configured content, including the selected particular copy of the chunk, by the content distribution system via the network using the network streaming protocol for receipt and rendering by at least one client device.

15. The method as described in claim 14, wherein the content is television or radio content that is broadcast over the air using the radio frequency signals.

16. The method as described in claim 14, wherein the network streaming protocol employs a manifest and the content is configured as a plurality of segments as specified by the manifest.

17. The method as described in claim 14, wherein the configuring includes switching between the first and second transmissions of the content in response to a failure to receive either one of the first or second transmissions.

18. The method as described in claim 14, further comprising exposing, by the content distribution system, a user interface for output by the client device to enable user selection of the frequencies and the times to be used by the plurality of content capture systems to capture the radio frequency signals.

19. The method as described in claim 14, wherein the content includes timestamps assigned to respective portions of the content.

20. The method as described in claim 19, wherein the transmission of the content is a full bitrate version of the content as converted by the content capture system from the radio frequency signals.

* * * * *